Aug. 5, 1941.   A. W. PHILLIPS   2,251,634
METHOD OF AND APPARATUS FOR PERFORATING
Filed April 30, 1938   4 Sheets-Sheet 4
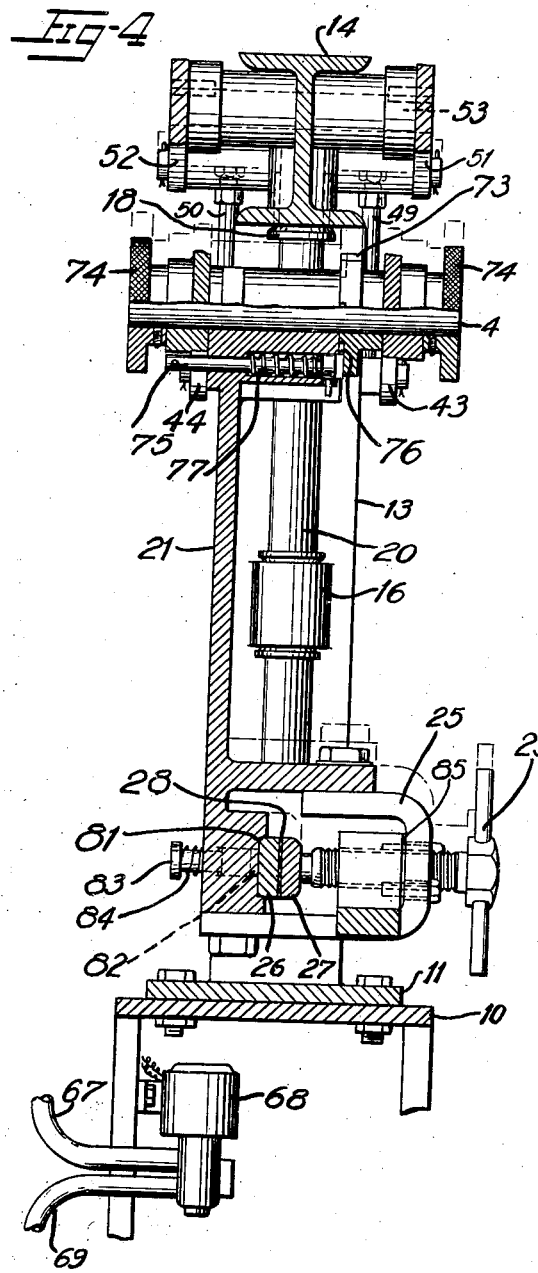
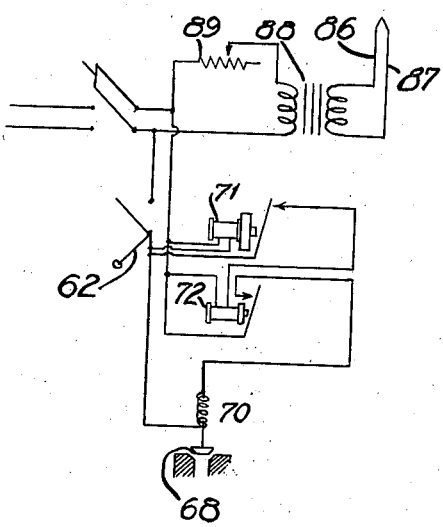
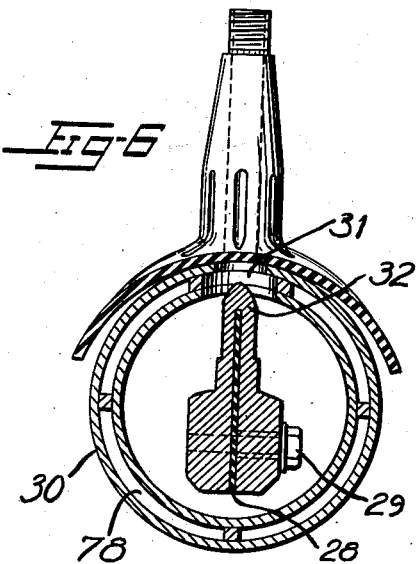
Inventor
Aubrey W. Phillips
By Willis F. Avery
Atty Patented Aug. 5, 1941

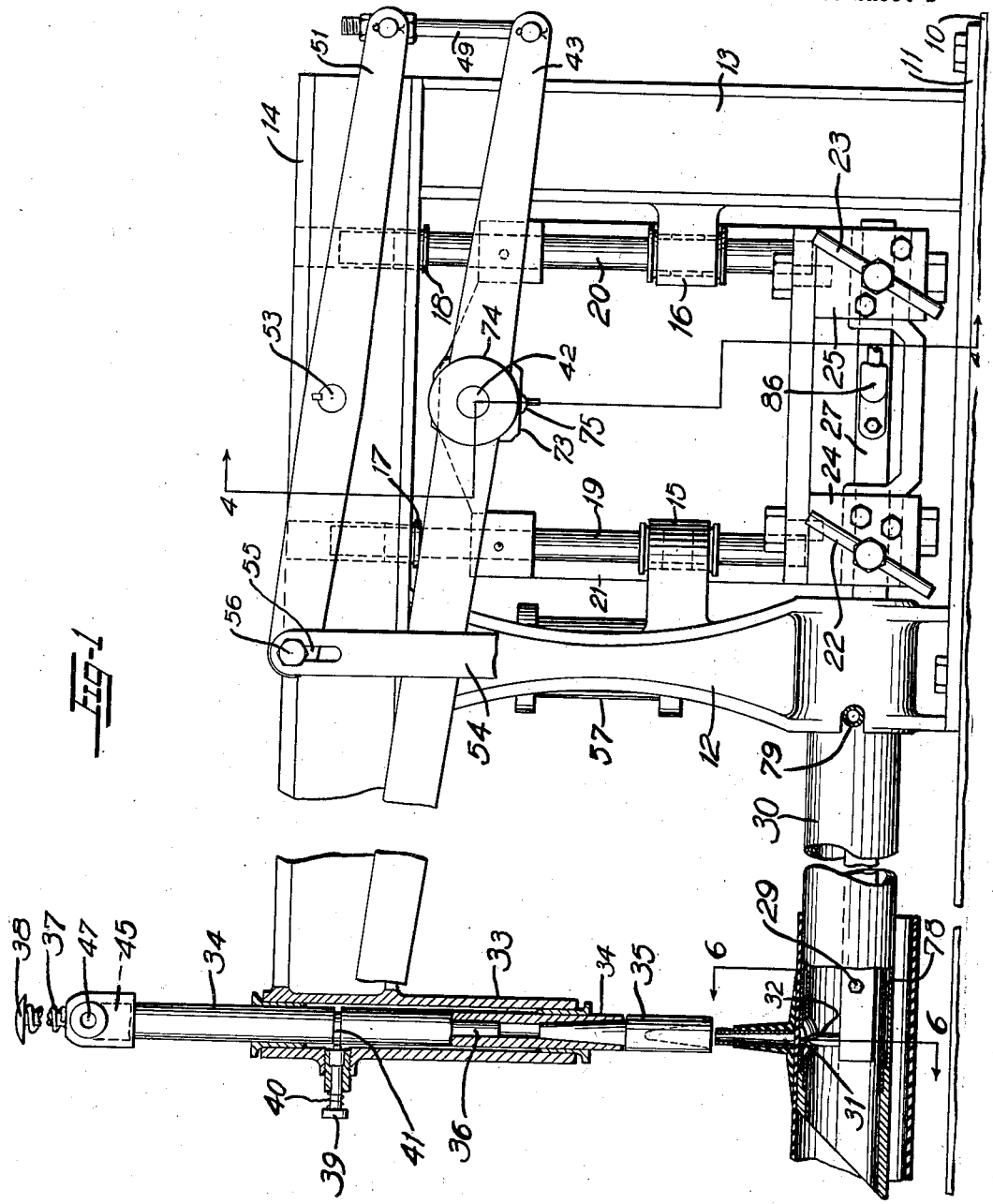

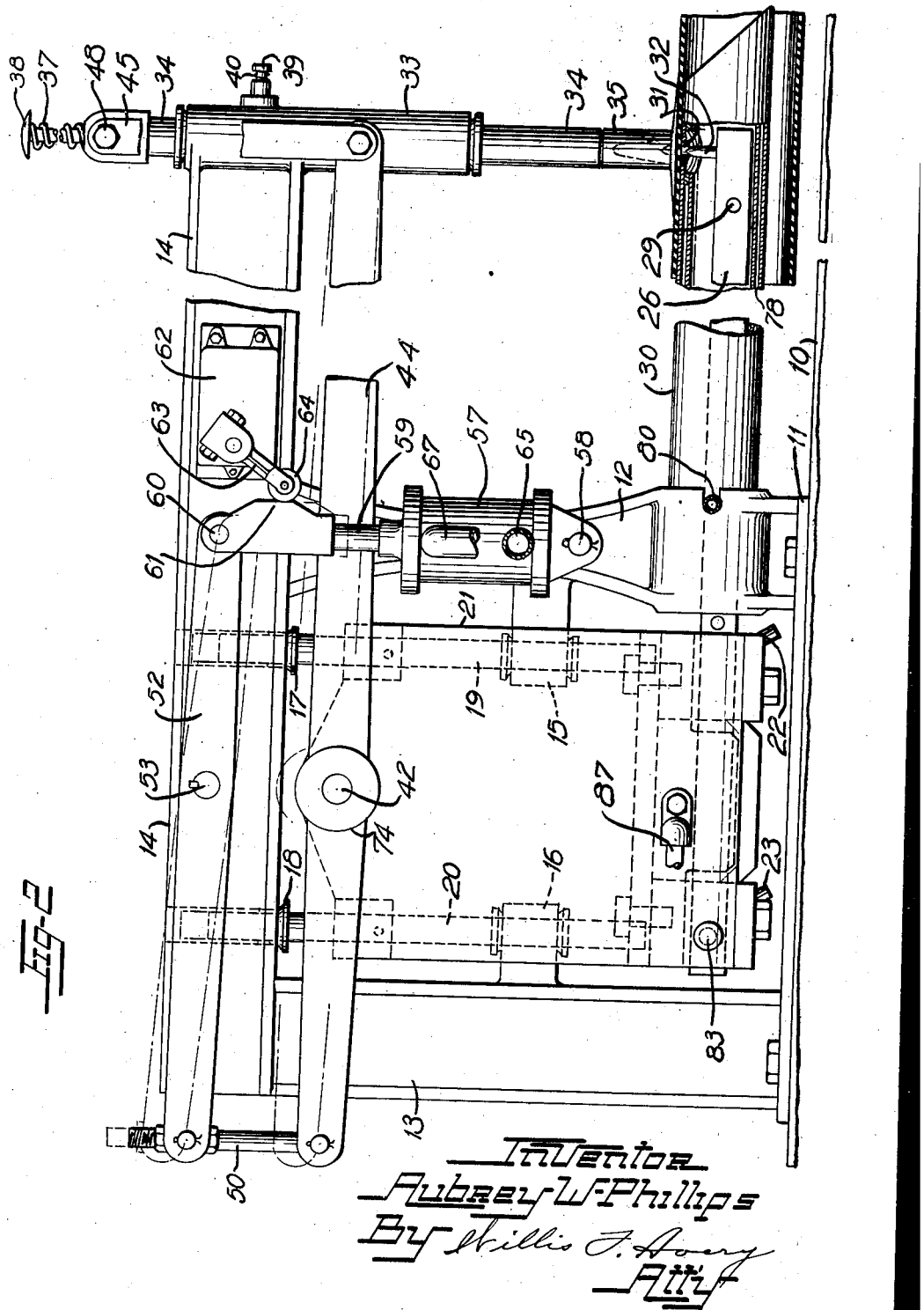

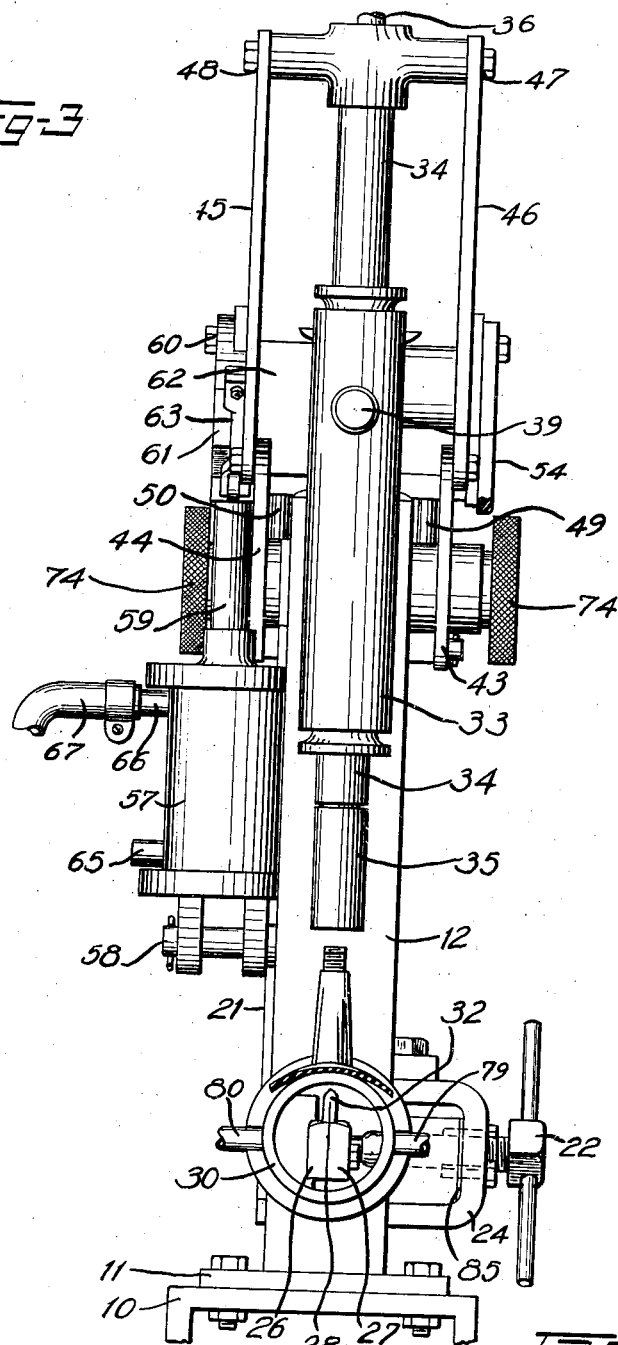

2,251,634

UNITED STATES PATENT OFFICE 2,251,634

METHOD OF AND APPARATUS FOR PERFORATING

Aubrey W. Phillips, Norristown, Pa., assignor to The B. F. Goodrich Company, New York, N. Y., a corporation of New York Application April 30, 1938, Serial No. 205,383

9 Claims. (Cl. 154—9)

This invention relates to perforating methods and apparatus and is especially useful in perforating a sheet of material in alignment with a projection on its surface as where a tire inner tube is to be perforated in alignment with a rubber valve stem fixed to its surface.

The principal objects of the invention are to eliminate the production of solid waste, to provide a more intimate bond between the sheet material and the material of the projection, to provide a clean perforation, and to provide accurate alignment.

Other objects are to provide a perforation by a burning operation, to provide accurate control of the burning operation, and to provide automatic release of the finished article.

These and other objects will appear from the following description and the accompanying drawings.

Of the drawings:

Fig. 1 is a front elevation of a preferred form of apparatus embodying the invention, partly broken away and partly in section, showing in section an inner tube and its valve stem before the perforation has been made therein, the locating spindle being shown in its raised position.

Fig. 2 is a rear elevation of the same, showing the locating spindle as lowered over the valve stem, parts being broken away and parts shown in section.

Fig. 3 is a side elevation of the same, the locating spindle being in raised position, parts being broken away, the inner tube being shown in section.

Fig. 4 is a vertical sectional view taken on line 4—4 of Fig. 1, the solenoid operated valve being also shown.

Fig. 5 is a wiring diagram showing the heating means and automatic time control means.

Fig. 6 is a cross sectional view taken on line 6—6 of Fig. 1, showing the burning member and the tube in place thereover.

Referring to the drawings, which illustrate the invention as applied to apparatus for perforating an inner tube wall, the numeral 10 designates a table on which is fixed a base 11 to which is fixed a pair of standards 12, 13 which support a horizontal frame member 14. Standards 12 and 13 are formed respectively with bearings 15, 16 and frame member 14 is formed with bearings 17, 18 in vertical alignment therewith. A pair of guide rods 19, 20 are slidably mounted therein and a cross head 21 is fixed thereto for vertical movement. Fixed to the cross head by clamp screws 22, 23 threaded through yokes 24, 25 is a horizontally disposed burner supporting bar comprising a pair of heavy metal strips 26, 27 insulated electrically from each other by a layer 28 of dielectric material and held in mechanical engagement by insulated bolts 29. The standard 12 is formed with a horizontal opening therethrough, in which is mounted a hollow mandrel or horn 30. An opening 31 is formed in the upper side of the mandrel near its outer end and a burning tip or heating element 32, split throughout most of its length is mounted on the burner supporting bar with its legs in electrical contact with the strips 26, 27 and with its point in alignment with the opening 31. The arrangement is such that the burning tip or heating element is normally enclosed by the mandrel 30, but may be raised through the opening 31 by vertical movement of the cross head 21.

To provide for centering the valve stem in alignment with the burner, the frame member 14 is formed with a guide bearing 33 in which is slidably mounted a hollow spindle 34 in alignment with the opening 31 in the mandrel. The spindle is formed at its lower end with a tapered socket in which a replaceable adapter 35 is frictionally mounted. A knockout rod 36 is enclosed by the spindle and held in an elevated position by a coil spring 37. A knob 38, mounted at its upper end may be used in projecting the knockout rod through the spindle to discharge the adapter.

To provide for locking the spindle against movement when the adapter is to be removed, a stop pin 39 is slidably mounted in the guide bearing 33 and is held out of engagement with the spindle by a compression coil spring 40. When the stop pin is pressed toward the spindle it is adapted to engage in a groove 41 formed in the spindle to lock the spindle against longitudinal movement.

To provide for moving the spindle into pressing engagement with the tube over the valve stem and for subsequently raising the burning tip or heating element into engagement with the work while continuing the pressure of the spindle against the work, a cross pin 42 is journaled in the cross head 21 and a pair of horizontal levers 43, 44 are journaled on either end thereof. A pair of links 45, 46, pivotally connected to the forward ends of the levers are pivotally connected to the spindle at 47, 48 respectively. The rear ends of levers 43, 44 are connected by links 49, 50 to the rear ends of a pair of horizontal levers 51, 52, keyed to a cross pin 53 which extends through and is journaled in frame member 14. A link 54 is provided with a slot 55 which engages over a pivot 56 on lever 51. The lower end of the link is pivotally attached to a pedal (not shown) whereby the operator may press the spindle into engagement with the work. The arrangement is such that the weight of the cross-head 21 causes the fulcrum 42 to remain fixed until the adapter 35 contacts with the work, whereupon the spindle being prevented from further movement, acts as a fulcrum, and upon further movement of the pedal, the cross-head 21 is lifted, and with it the burning tip.

To retain the burning tip or heating element and the spindle in contact with the work for a determinate time after initial contact with the work and after the pedal is released, a single acting fluid pressure cylinder 57, preferably operated by compressed air, is pivotally mounted at 58 to the standard 12. Its piston rod 59 is pivoted at 60 to lever 52 and is formed with a cam 61. An electric limit switch 62 mounted on frame member 14 has a lever arm 63 which carries a roller 64 adapted to engage cam 61. The arrangement is such that when the spindle 34 is depressed, the cam 61 engages the roller 64 and closes the switch 62 which is normally open.

The cylinder 57 has a lower port 65 open to the atmosphere and an upper port 66 connected by a pipe 67 to a normally closed solenoid operated valve 68 by which the cylinder may be charged from a supply line 69, or discharged through an exhaust opening.

When the switch 62 is closed it energizes the solenoids of the relays 71, 72. Relay 71 is of the normally closed circuit delayed contact-opening type and controls the circuit which includes the solenoid of relay 72. Relay 72 is normally open and controls the circuit which includes the solenoid 70 of valves 68. When solenoid 70 is energized, valve 68 admits air under pressure to cylinder 57, thereby holding the burning tip in its upper or operative position. After a determinate length of time, controlled by the setting of relay 71, relay 72 opens the circuit to solenoid 70 and valve 68 is adjusted to permit cylinder 57 to exhaust, permitting the burning tip 32 to drop to its lowest position. The arrangement is such that although the operator removes his foot from the pedal, the burning tip will remain in contact with the work a sufficient time to burn a clean hole of the proper size.

To provide for limiting the travel of the burning tip or heating element 32, an adjustable stop member 73 is fixed to pivot pin 42. The stop comprises a polygonal disc, each side of which is at a different distance from the axis of the pin 42. A knurled handle 74 is also fixed to the pin, to rotate the stop to its different settings. A latch pin 75 is slidably mounted in the cross-head 21 and is adapted to engage locking slots 76 in the stop 73, the latch being held in such engagement by a coil spring 77. The stop 73 is adapted to engage the lower surface of the frame member 14.

To provide for cooling the mandrel 36, a water jacket space 78 is formed therein between concentrically spaced walls and an inlet tube 79 and outlet tube 80 are connected thereto, whereby water or other cooling fluid may be circulated through the jacket.

To provide for locating the burner supporting bar in proper position in the machine the cross-head 21 is formed with a groove 81 to seat the bar 26 and the bar is secured against endwise motion by a dowel 82. A knock-out pin 83 is slidably mounted in the cross-head in alignment with the dowel 82 and is normally held away from the dowel pin by a coil spring 84.

In order to prevent shorting of the bars 26, 27, the clamp screws 22, 23 are insulated from the cross-head by suitable insulating bushings such as 85. Contact with the bars 26, 27 is made by cables 86, 87 which connect it to a suitable source of current such as the secondary of a transformer 88, the primary of which is supplied with current through a rheostat 89 whereby the temperature of the burner tip may be regulated.

In the operation of the device, the valve stem is applied to an undetermined portion, and preferably to an unprepared external surface of the inner tube wall which is preferably in an unvulcanized condition. The attaching face of the valve stem flange has been buffed and cemented to promote adhesion. The inner tube is then placed over the horn or mandrel with its valve tube in substantial alignment with the socket 35. The foot pedal is depressed so as to bring the socket down over the valve tube. The socket presses the tube against the mandrel. Continued movement causes the burning point to be raised. The switch 62 closes during such movement and air is admitted to cylinder 57 to hold the burning element in burning position. The operator steps off the pedal and after a determinate time, controlled by the adjustment of the timing relay 71, the air is exhausted from cylinder 57 and the weight of the cross-head causes the parts to return to their original positions. By continuing the burning or heat-reducing operation after the tube wall has been penetrated, the rubber is burned away or consumed so as to clear the burner tip and not to close the opening by elasticity of the rubber or by the presence of waste material when the tip is withdrawn. The tip not only burns a clean aperture through the tube wall, but also burns out any fins or other irregularity in the valve stem tube and tends to weld the valve tube and the tube wall together.

By consuming the waste material, the valve opening is left free from any slug or obstruction which might interfere with the passage of air therethrough.

Variations may be made in the device without departing from the invention as defined by the following claims.

I claim:

1. Apparatus for perforating a wall of an article of rubberlike material in alignment with the bore of a tubular projection thereon, said apparatus comprising a heating element of a shape effective in its heated condition to pierce said material by substantially complete heat-reduction of an area of the material without forming a slug, and means cooperable with said tubular projection of the article for locating said material and bore with relation to said heating element.

2. Apparatus for perforating a wall of an article of rubberlike material in alignment with the bore of a tubular projection thereon, said apparatus comprising a heating element of a blunt shape effective in its heated condition to pierce said material by substantially complete heat-reduction of an area of the material without forming a slug, means for heating said element, and means cooperable with said tubular projection of the article for locating said material and bore with relation to said heating element.

3. Apparatus for perforating a wall of an article of rubberlike material in alignment with the bore of a tubular projection thereon, said apparatus comprising a heating element of a shape effective in its heated condition to pierce said material by substantially complete heat-reduction of an area of the material without forming a slug, means cooperable with said tubular projection of the article for locating said material and bore with relation to said heating element, and means for feeding at least one of said heating element and said locating means toward the other to effect such heat-reduction of the material.

4. Apparatus for perforating a wall of an article of rubber-like material in alignment with the bore of a tubular projection thereon, said apparatus comprising a heating element of a blunt shape effective in its heated condition to pierce said material by substantially complete heat-reduction of an area of the material without forming a slug, means for heating said element, means cooperable with said tubular projection of the article for locating said material and bore with relation to said heating element, and means for feeding at least one of said heating element and said locating means toward the other to effect such heat-reduction of the material.

5. Apparatus for perforating a wall of an article of rubber-like material in alignment with the bore of a tubular projection thereon, said apparatus comprising a heating element of a shape effective in its heated condition to pierce said material by substantially complete heat-reduction of an area of the material without forming a slug, a support for said material surrounding said element and having an aperture aligned with said heating element, and means cooperable with said tubular projection of the article for locating said material and bore with relation to said aperture and heating element.

6. Apparatus for perforating a wall of an article of rubber-like material in alignment with the bore of a tubular projection thereon, said apparatus comprising a heating element of a shape effective in its heated condition to pierce said material by substantially complete heat-reduction of an area of the material without forming a slug, means cooperable with said tubular projection of the article for locating said material and bore with relation to said heating element, means for feeding at least one of said heating element and said locating means toward the other to effect piercing of said material, and means for automatically holding said element and said locating means in such relation for a period of time to effect such heat-reduction of the material.

7. Apparatus for perforating a wall of an article of rubber-like material in alignment with the bore of a tubular projection thereon, said apparatus comprising a heating element of a blunt shape effective in its heated condition to pierce said material by substantially complete heat-reduction of an area of the material without forming a slug, means cooperable with said tubular projection of the article for locating said material and bore with relation to said heating element, means for feeding at least one of said heating element and said locating means toward the other to effect piercing of said material, means for automatically holding said element and said locating means in such relation for a period of time to effect such heat-reduction of the material, and means for automatically returning said element and said heating means at the end of said period of time.

8. The method of perforating a wall of an article of rubber-like material in alignment with the bore of a tubular projection thereon, which comprises positioning said article by engagement with said projection, and piercing said material at said bore with a heated element by substantially complete heat-reduction of an area of said material without forming a slug.

9. The method of making an inner tube of rubber-like material which comprises securing a tubular hollow valve stem to the tube wall, positioning the article by engagement with said tubular stem, and piercing the rubber-like material in alignment with the bore of said stem with a heated element by substantially complete heat-reduction of an area of said material without forming a slug.

AUBREY W. PHILLIPS.